Nov. 12, 1935.  J. E. JEWETT  2,020,506
PRODUCTION OF MONOCARBOXYLIC ACIDS AND THEIR DERIVATIVES
Filed July 26, 1930
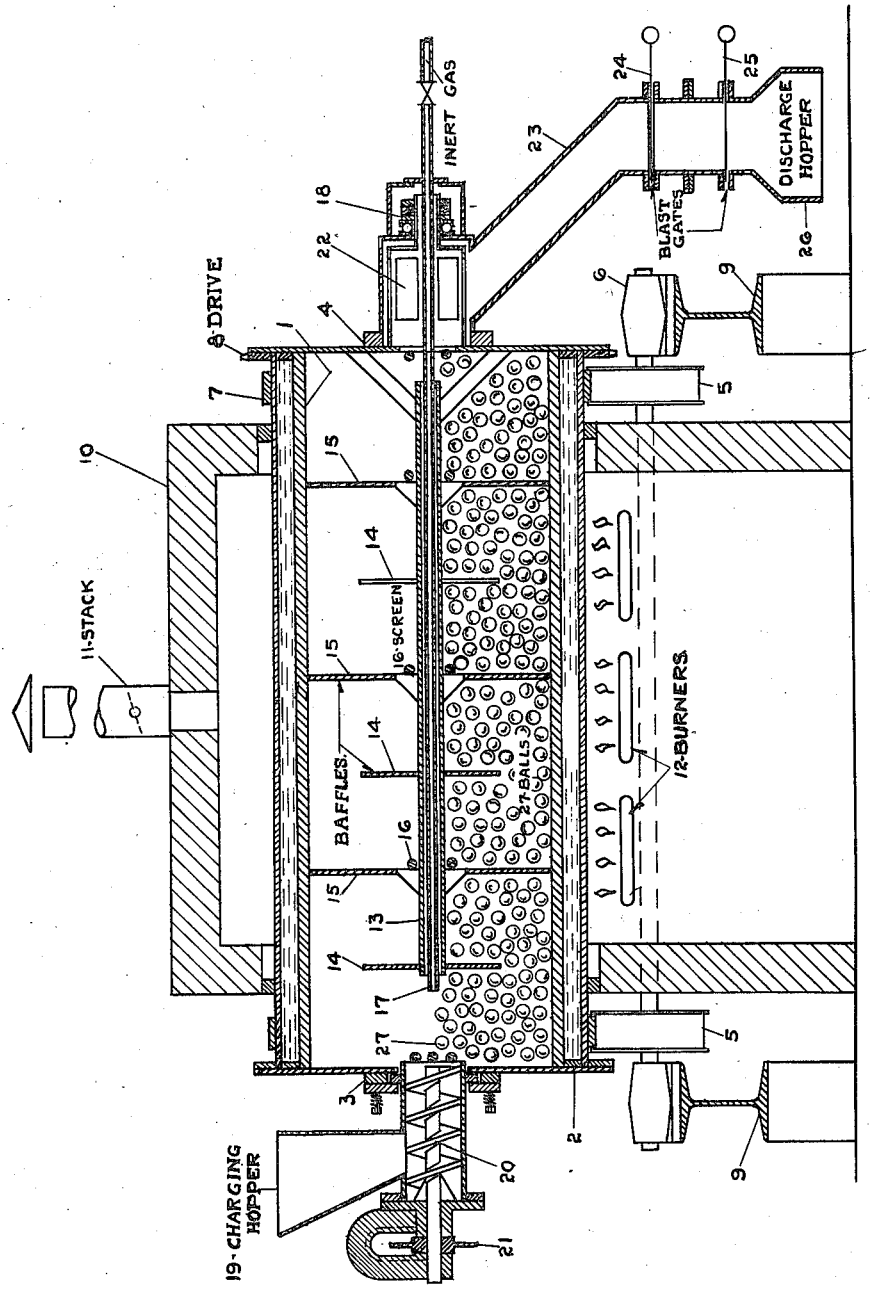
INVENTOR
JOSEPH E. JEWETT
BY
ATTORNEY Patented Nov. 12, 1935

2,020,506

UNITED STATES PATENT OFFICE 2,020,506

PRODUCTION OF MONOCARBOXYLIC ACIDS AND THEIR DERIVATIVES

Joseph E. Jewett, Mount Lebanon, Pa., assignor, by mesne assignments, to American Cyanamid & Chemical Corporation, a corporation of Delaware Application July 26, 1930, Serial No. 470,856

3 Claims. (Cl. 260—108)

This invention relates to the production of monocarboxylic acids from polycarboxylic acids, and more specifically to the production of benzoic acid from phthalic acid.

In the past benzoic acid has been prepared from phthalic acid by passing a mixture of calcium phthalate and calcium hydroxide with a diluent such as calcium carbonate through narrow heated tubes. This procedure is described in the patent to Fairweather, Beckett, and Thomas No. 1,727,102 dated September 3, 1929. This process has proved to be of little value practically since the difficulties of slowly conveying the material through narrow heated tubes are practically insuperable. At the high temperature at which the reaction takes place there is a serious tendency for the material to agglomerate and form a thin coating on the inside of the tube, resulting in much spoiled material and so decreasing the heat conduction as to make the process practically worthless.

It is proposed in the co-pending application of Alphons O. Jaeger Serial No. 470,832 filed July 26, 1930 to pass a salt of a polycarboxylic acid with a strong base with or without a diluent through a rotating kiln provided with balls and separated into compartments by screens which are of a mesh sufficiently fine to prevent the passage of the balls but coarse enough to permit the powdered reaction material to freely pass. This principle effects notable improvements in the process over the narrow heated compartments of the prior art but is open to the disadvantage that the powdered material can pass through the full area of the screen and, therefore, in order to provide for a sufficiently slow passage through the kiln and correspondingly a sufficiently long heating time the kiln must be made very long with resulting increased expense, or the feed of material must be slowed up which makes for a less reliable regulation.

According to the present invention all of the advantages of the rotating kiln and balls are retained and at the same time an even more accurate temperature control is obtained together with a relatively long passage in a kiln of moderate length, thereby permitting a rapid feed of material without necessitating excessive length of kiln, according to the present invention, instead of dividing the kiln into compartments separated by screens, it is divided into a larger number of compartments by baffles alternatively extending from a hollow central shaft partway to the periphery of the rotary kiln and from the periphery of the central kiln partway to the hollow shaft, being connected therewith by a screen. Thus, the flow of material through the kiln is not horizontal but the material is forced to adopt a sinuous course first under a baffle then over the next, etc., practically doubling the effective length of travel of the material in the kiln and permitting a very thorough agitation with the balls and a correspondingly excellent temperature and reaction control. The effective length of the kiln is greatly extended and in some cases more than doubled by the present invention, and a great saving in apparatus cost and an improved reaction control is obtained.

The kiln may be horizontal as shown in the drawing or may be inclined as shown in some of the modifications of the Jaeger application referred to above, and the heating may be of any desired kind. Preferably, however, the kiln is surrounded by a jacket containing a bath so that its temperature is equalized throughout. The particular mode of heating forms no part of the present invention.

Any suitable ball material may be used, but preferably balls of high conductivity such as ordinary steel or high chrome steel balls are used as they give a better temperature control; the invention, however is in no sense limited to any ball material.

The invention is not only applicable to the production of benzoic acid or, rather, benzoates from phthalic acid, but is generally applicable to the production of other monocarboxylic acid compounds from polycarboxylic acid compounds, for example, the production of naphthoic acid from naphthalic acid, propionic acid from succinic acid, etc.

The temperatures used in general fall within the same range as those employed in the narrow heated compartments of the prior art, and the present invention is not limited to any particular new temperature or temperature range. At the high temperature used, it is usually desirable to provide for a protecting atmosphere during reaction since of course the material is open to whatever atmosphere is present, in contradistinction to the narrow tubes of the prior art where the tube is normally operated full. Any suitable protecting atmosphere may be used such as an inert gas, for example, nitrogen, or, if desired, a reducing atmosphere may be used such as hydrogen, hydrocarbon vapors, and the like; steam may also be used. When hydrogen is used, particularly with salts of the polycarboxylic acid and reducing metals such as copper, nickel, zinc, and the like, aldehydes may be obtained. The production of aldehydes or acids by carrying out the process in a reducing atmosphere is not claimed per se in the present application, this being the subject matter of the co-pending application of Alphons O. Jaeger Serial No. 359,722 filed May 1, 1929, now Patent No. 1,961,150, dated June 5, 1934.

The drawing is a vertical section through a horizontal ball kiln illustrating a typical embodiment of the present invention.

The kiln consists of a shell 1, surrounded by a jacket containing a bath 2, being carried on rollers 5 which engage with tracks 7 surrounding the kiln. The rollers are on a shaft mounted in bearings 6 on supporting beams 9. The whole is surrounded by a covering 10 provided with a stack 11. Burners 12 are located in the enclosure 10 just below the rotating kiln. The drive is by a chain to a sprocket 8. The kiln is filled with balls 27 and is provided with a hollow central shaft 13 from which extend alternate baffles 14. Baffles 15 extend from the walls of the kiln between successive baffles 14 almost to the shaft 13, the remaining annular space being filled by the screens 16. A charging hopper 19 extends into a central opening in one end of the kiln and is provided with a screw conveyor 20 driven by a sprocket 21. At the other end the kiln is provided with a central extension with discharge slots 22 which permit discharging through the pipe 23 controlled by the blast gates 24 and 25 into the discharge hopper 26. This extension is fastened into the thrust bearing 18, and a pipe 17 extends through the hollow shaft 13 for the introduction of an inert gas into the interior of the kiln. A gas-tight closure 4 is provided between the kiln and the discharge pipe 23, and similarly the hopper extension passes into the kiln through the seal 3.

The operation of the apparatus for producing calcium benzoate is as follows:—The kiln is provided with a lead bath and is heated to a temperature between 400–450° C. The rotation of the kiln is started and a powdered mixture containing calcium phthalate, calcium hydroxide and calcium carbonate in the proportion of 2 mols calcium phthalate, 1.2 mols calcium hydroxide and a weight of calcium carbonate equal to two-thirds the combined weight of the calcium phthalate and calcium hydroxide is introduced into the charging hopper 19. The screw conveyor 20 is started and the charge is fed into the kiln gradually, passing over and under the successive baffles in a sinuous course with constant agitation and grinding by the balls. The reacted material discharges through the slots 22 and by alternate opening and closing of the blast gates 24 and 25 passes into the discharge hopper. The period during which the charge is in the kiln is determined by the rate of feed and, therefore, can be adjusted by varying the speed of the conveyor 20. With thirty minutes heating period and a bath temperature of 437° C. yields from 85 to 92% are obtained, the remainder consisting in about equal parts of unreacted calcium phthalate and waste material such as benzol, charred material, and the like.

It will be noted that the molecular proportion of calcium hydroxide to calcium phthalate is 1.2:2 instead of 1:2 as described in the prior art and as called for by the theoretical reaction. The amount of calcium carbonate is also about two-thirds of that used in the prior art. The reason for using an excess of calcium hydroxide is due to the fact that some of the decomposition of the calcium phthalate results in the production of additional carbon dioxide, as, for example, when some of it is cracked to benzol or completely burned to carbon dioxide and water in case traces of oxygen are present. This additional carbon dioxide unites with some of the calcium hydroxide and makes an excess desirable for best results. The process of the present invention can, of course, be carried out with the proportions called for by the prior art but the yields are not quite as good although still better than when the narrow heated tubes are used.

It should be noted that an excess of lime is not claimed per se in the present invention, this constituting the subject matter of the co-pending application of A. O. Jaeger Serial No. 471,594 filed July 29, 1930, now Patent No. 1,885,834, dated Nov. 1, 1932. This improvement of process is covered in the present application only in connection with the use of rotary ball kilns which form the subject matter of the present invention.

In a similar manner calcium naphthalate or calcium succinate can be transformed into the salts of the corresponding monocarboxylic acids.

What is claimed as new is:

1. A method of manufacturing monocarboxylic acid salts comprising causing a mixture of a salt of dicarboxylic acid and a hydroxide of an alkaline earth to advance while heated to reaction temperatures through a mass of inert, heavy, heat conductive bodies which are being tumbled without advancement as a mass in a direction transverse of the plane of tumbling, the path of the mixture being sinuous with respect to the general direction of advance.

2. A method of manufacturing monocarboxylic acid salts comprising causing a mixture of a salt of phthalic acid and a hydroxide of an alkaline earth to advance while heated to reaction temperatures through a mass of inert, heavy, heat conductive bodies which are being tumbled without advancement as a mass in a direction transverse of the plane of tumbling, the path of the mixture being sinuous with respect to the general direction of advance.

3. A method of manufacturing monocarboxylic acid salts, comprising causing a mixture of a calcium salt of phthalic acid and a hydroxide of calcium to advance while heated to reaction temperatures through a mass of inert, heavy, heat conductive bodies which are being tumbled without advancement as a mass in a direction transverse of the plane of tumbling, the path of the mixture being sinuous with respect to the general direction of advance.

JOSEPH E. JEWETT.